United States Patent
Al-Haddad (10) Patent No.: US 10,958,209 B2
(45) Date of Patent: Mar. 23, 2021

(54) DEPLOYABLE SOLAR PHOTOVOLTAIC POWER GENERATION SYSTEM

(71) Applicant: Lux Infinitum, LLC, Atlanta, GA (US)

(72) Inventor: Tristan Al-Haddad, Atlanta, GA (US)

(73) Assignee: Lux Infinitum, LLC, Atlanta, GA (US)

( * ) Notice: Subject to any disclaimer, the term of this patent is extended or adjusted under 35 U.S.C. 154(b) by 0 days.

(21) Appl. No.: 16/374,789

(22) Filed: Apr. 4, 2019

(65) Prior Publication Data

US 2019/0379324 A1 Dec. 12, 2019

Related U.S. Application Data

(60) Provisional application No. 62/657,060, filed on Apr. 13, 2018.

(51) Int. Cl.
*H02S 30/20* (2014.01)
*H02S 10/40* (2014.01)
*H02S 20/30* (2014.01)

(52) U.S. Cl.
CPC .............. *H02S 30/20* (2014.12); *H02S 10/40* (2014.12); *H02S 20/30* (2014.12)

(58) Field of Classification Search
CPC ........... H02S 30/20; H02S 10/40; H02S 20/30
See application file for complete search history.

(56) References Cited

U.S. PATENT DOCUMENTS

| 8,297,273 | B2 | 10/2012 | Chyou et al. | |
|---|---|---|---|---|
| 9,196,771 | B2 | 11/2015 | Rodin et al. | |
| 9,496,822 | B2* | 11/2016 | Gerwing | H02S 40/00 |
| 9,612,039 | B2 | 4/2017 | Meppelink et al. | |
| 2013/0233371 | A1* | 9/2013 | Rodin | H01M 10/613 |
| | | | | 136/245 |
| 2013/0240015 | A1* | 9/2013 | Chaimovski | H02S 10/40 |
| | | | | 136/245 |
| 2014/0158649 | A1* | 6/2014 | Al-Haddad | F16M 11/00 |
| | | | | 211/41.1 |

OTHER PUBLICATIONS

The International Search Report/Written Opinion issued by the U.S. Receiving Office dated Jun. 24, 2019 for corresponding International Patent Application No. PCT/US2019/025697; 11 pages.

\* cited by examiner

*Primary Examiner* — Jayne L Mershon
(74) *Attorney, Agent, or Firm* — Smith Gambrell & Russell, LLP (57) ABSTRACT

A deployable solar photovoltaic power generation system includes an array of photo voltaic panels mounted to expandable truss. In response to environmental input data, the array of photovoltaic panels can be deployed or stowed.

13 Claims, 8 Drawing Sheets

DEPLOYABLE SOLAR PHOTOVOLTAIC POWER GENERATION SYSTEM

CLAIM OF PRIORITY

This application claims priority from U.S. Provisional Patent Application Ser. No. 62/657,060, filed on Apr. 13, 2018, which is incorporated herein in its entirety.

FIELD OF THE INVENTION

This invention relates to a solar photovoltaic power generation system and more particularly to a deployable solar photovoltaic power generation system.

BACKGROUND OF THE INVENTION

One of the most significant barriers to implementing photovoltaic power generation plants in the United States is not in the fundamental development of the solar photovoltaic panels, but rather in the balance of system designs. The Department of Energy recognized this issue by launching the Sunshot Initiative in 2010 which focused on balance of system designs rather than photovoltaic panel fundamentals or manufacturing hurdles. Current reports from the National Renewable Energy Laboratory state that balance of system costs are approaching 70% of total systems costs. Installation of solar photovoltaic power generation systems for a period of 5 to 10 years on a particular site is not currently cost effective because of the costs involved in planning, designing, permitting, and installing of solar power generation exceed that of other power generation systems.

Because of the surface area of photovoltaic panels for power generation, wind loads drive the design of photovoltaic panel arrays for power generation systems. Consequently, photovoltaic panel arrays are currently designed for the full wind loads found in U.S. building codes. Full wind load design requires substantial amount of ballast weight in the base of the photovoltaic panel array and a substantial amount of structural steel in the frame of the photovoltaic array.

No current system exists that will allow short-term installation of solar photovoltaic power generation systems in a cost-effective manner. PWRstation SA of Lausanne, Switzerland markets a mobile rack solar panel system under the mark EXOrac. The EXOrac system is only able to be installed for very short periods due to an inability to resist wind loads generally required in the permitting process for solar photovoltaic generation systems. The EXOrac system requires continuous monitoring by humans and is manually retracted and rolled indoors to be stored during a wind or snow event. Because of its flimsy structure, the EXOrac system is incapable of meeting building code requirements. For this reason, the EXOrac system is not able to receive installation permitting by the authorities having jurisdiction and thus has had little impact on the market.

SUMMARY OF THE INVENTION

A deployable solar photovoltaic power generation system of the present invention overcomes the foregoing problems of short-term installation and compliance with building code requirements particularly compliance with respect to wind loading. In order to solve those problems of the prior art, the deployable solar photovoltaic generation system of the present invention is a prefabricated deployable solar photovoltaic power generation system capable of adapting and scaling to a wide range of uses. The deployable solar photovoltaic power generation system includes a ballast base supporting a foldable solar photovoltaic panel array.

The solar photovoltaic panel array of the present invention comprises one or more wings, each wing typically comprising 12 individual solar photovoltaic panels that generate 4 kW, nominal. The term "solar photovoltaic panel" in this application refers to a group of individual photovoltaic panels. The wings include the solar photovoltaic panels that are supported by a four-point expandable truss. Each four-point truss includes successive multiple pairs of horizontal truss arms and upwardly extending truss arms. The horizontal trust arms and the upwardly extending truss arms are rotatably connected at their mid-points to form an X-shaped configuration. The ends of the horizontal trust arms and the upwardly extending truss arms are rotatably connected at their ends to define an upper set of endpoints and a lower set of endpoints. Forward cross members and rear cross members are connected between the endpoints to form a series of horizontal panel frames for supporting the solar panels before deployment. Prior to deployment of the wings, the truss folds into a flat compact configuration for shipping and handling. The flat compact configuration also presents minimum wind resistance.

An upper tension cable connects the upper endpoints in the longitudinal direction of each truss, and a lower tension cable connects the lower endpoints in the longitudinal direction of each truss. The upper tension cable and the lower tension cable serve to limit the distance between the endpoints once the wings have been fully deployed. Once the four-point expandable trusses have been deployed and the tension cables are tight, compression members rotate into positions between the adjacent upper endpoints and lower endpoints to establish the distance between the series of upper endpoints and lower endpoints and thus provide additional structural integrity to the truss.

Once the four-point expandable trusses for each wing has been fully extended, the forward end of the solar photovoltaic panels rotate upward by means of a torsion spring or a servo motor about the rear cross member of the horizontal panel frames. Upward rotation of the solar photovoltaic panels is arrested when the forward end of the solar panel contacts stops on the rear cross member of the successive horizontal panel frame. Once the solar panels have rotated upwardly and are engaged by the stops, all of the solar panels on each wing lie in a common plane.

The wings may be ganged to address multiple applications, for example, as containerized forward-operating base generators for disaster relief operations or multi-megawatt grid-tied power plants. Because of the foldable nature of the wings, the deployable solar photovoltaic power generation system can be deployed in temporary locations such as parking lots around abandoned suburban malls. Further, the deployable solar photovoltaic power generation system is deployed using intelligent electro-mechanical controls. With the use of intelligent electro-mechanical controls to deploy the wings of the solar photovoltaic power generation system, the deployable solar photovoltaic power generation system can be rapidly deployed and then stowed into a folded flat pack.

The intelligent electro-mechanical control deploys and stows the wings of the solar photovoltaic power generation system based on a variety of control inputs. Such control inputs may include without limit: real-time wind speed, real-time barometric pressure, real-time light intensity, weather forecast data, weight resulting from ice and snow on the solar photovoltaic panels, seismic data, latitude, and date/time.

The solar photovoltaic generation system can manipulate or stow the wings to protect the solar photovoltaic panel array from high wind loads or predicted snow and ice loads. The rapid electro-mechanical controlled deployment and stowing of the wings of the solar photovoltaic power generation system offers advantages not only in terms of remote deployment in locations that may be temporary, the rapid electro-mechanical deployment and stowing of the wings offers options in dealing with wind and other weather conditions. For example, during a moderate wind event, the solar photovoltaic panels can be rotated about the rear cross member of the trusses from the single plane configuration to a louver-like configuration thereby presenting less wind resistance as the air passes through the openings between the solar photovoltaic panels thereby resulting in dynamic venting. Alternatively, in more severe wind conditions, the wings can be folded into a flat stack that offers little wind resistance. Further, the wings of the deployable solar photovoltaic power generation system can be stowed any time the solar energy is not sufficient to provide power. The solar photovoltaic panel array can also be stowed when snow or ice begin accumulating on the solar photovoltaic panels.

The ability of the deployable solar photovoltaic power generation system to accommodate wind loads by modifying or storing the wings allows as much as a 400% reduction in the weight of the solar photovoltaic power generation system of the present invention as compared to standard solar photovoltaic power generation systems that must meet standards for full wind loading as shown in Table 1 below.

TABLE 1

Design Wind Loads and Estimated Weights of the Deployable Solar Photovoltaic Power Generation System.

| Case | Return Period | Wind Velocity (mph) | Wind Pressure (psf) | Steel Weight (lbs) | Ballast Weight (lbs) |
|---|---|---|---|---|---|
| Fixed | 700 years* | 115 | 19.7 | 520 | 5500 |
| Infrequent Stowing | 1 year | 55 | 4.6 | 180 | 1280 |
| Frequent Stowing | 1 week | 20 | 0.6 | 140 | 800 |

*Represents the code-prescribed wind for most of the CONUS (ASCE 7-2010).

Further objects, features and advantages will become apparent upon consideration extended solar of the following detailed description of the invention when taken in conjunction with the drawings and the appended claims.

DETAILED DESCRIPTION OF THE PREFERRED EMBODIMENT

A first embodiment of a deployable solar photovoltaic power generation system 10 is shown in FIGS. 1-5F. A second embodiment of a photovoltaic power generation system 100 is shown in FIGS. 6A-6D.

Figure 5A:
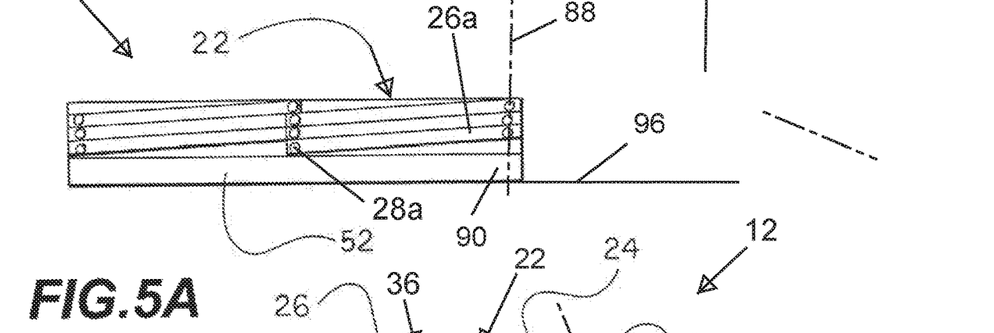
FIGS. 5A-5F are side elevation views of the first embodiment of the solar photovoltaic panel array of the deployable solar photovoltaic power generation system showing the deployment sequence in accordance with the present invention.
Figure 5B:
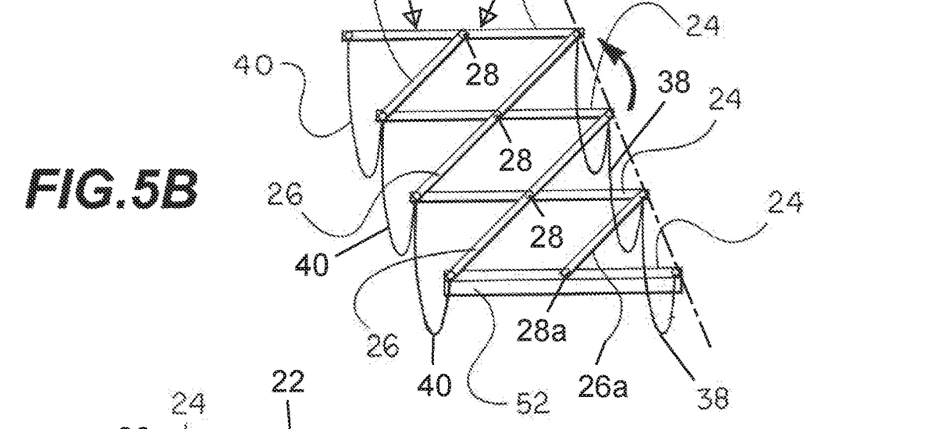
Figure 5C:
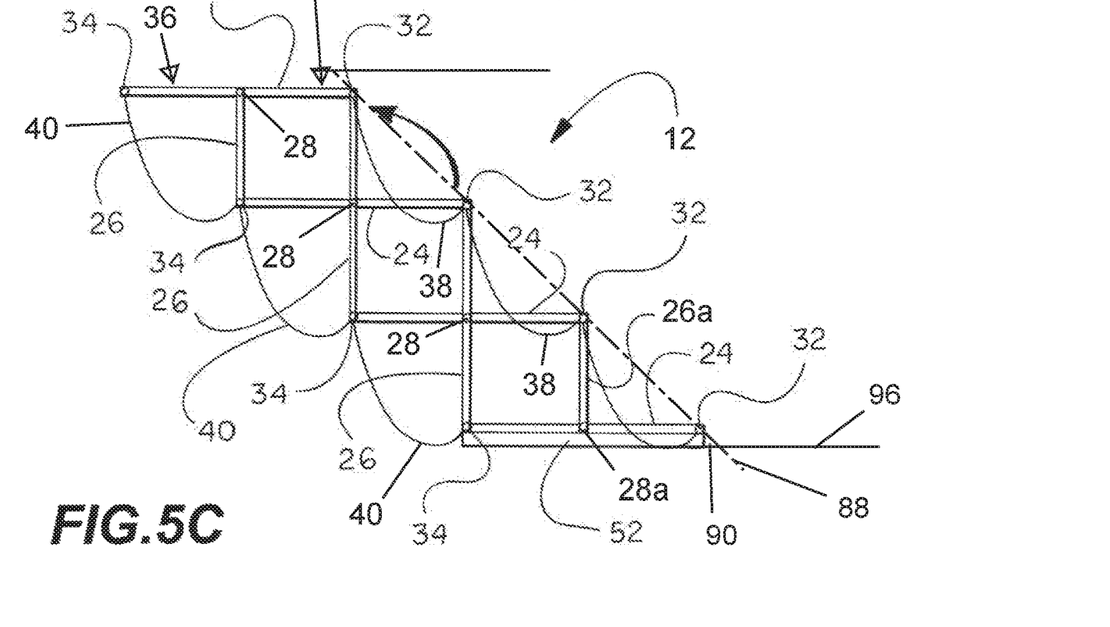
Figure 5D:
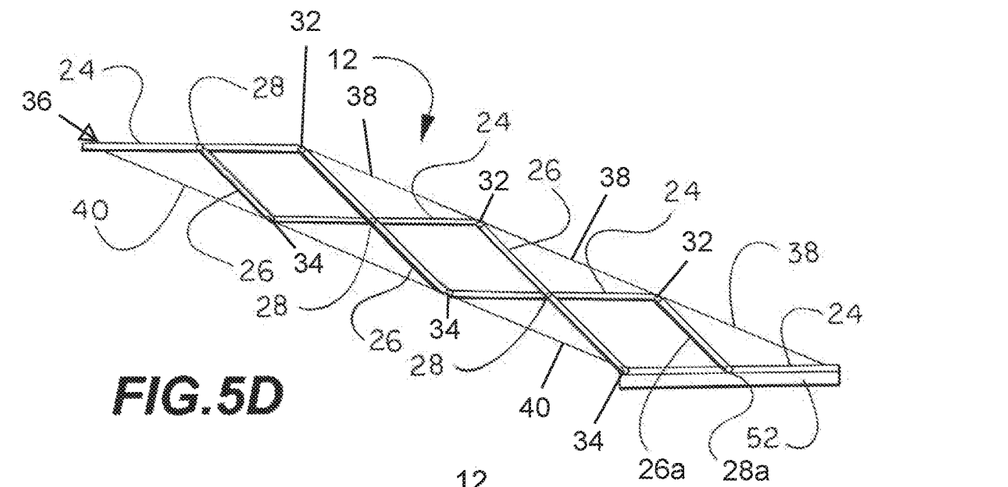

With respect to the first embodiment, the deployable solar photovoltaic power generation system 10 includes a foldable solar panel array 12 supported on a ballast base 52. The solar panel array 12 includes one or more wings 14. Each wing 14 typically comprises 12 individual solar photovoltaic panels that generate 4 kW, nominal. The term "solar photovoltaic panel" in this application refers to a group of individual photovoltaic panels 16. The wings 14 include the solar photovoltaic panels 16 that are supported by a four-point expandable truss 22. Each four-point truss 22 includes successive multiple pairs of horizontal truss arms 24 and upwardly extending truss arms 26. The horizontal trust arms 24 and the upwardly extending truss arms 26 are rotatably connected at their mid-points 28 to form an X-shaped configuration. The ends of the horizontal trust arms 24 and the upwardly extending truss arms 26 are rotatably connected at their ends to define an upper set of endpoints 32 and a lower set of endpoints 34 (FIG. 5C). Forward cross members 44 and rear cross members 46 are connected between the lower endpoints 34 and upper endpoints 32 respectively of the truss 22 to form a series of horizontal panel frames 36 for supporting the solar panels 16 before and during deployment. Prior to deployment of the wings 14, the truss 22 folds into a flat compact configuration for shipping and handling as shown in FIG. 5A. The flat compact configuration also presents minimum wind resistance.

Figures 2, 3:
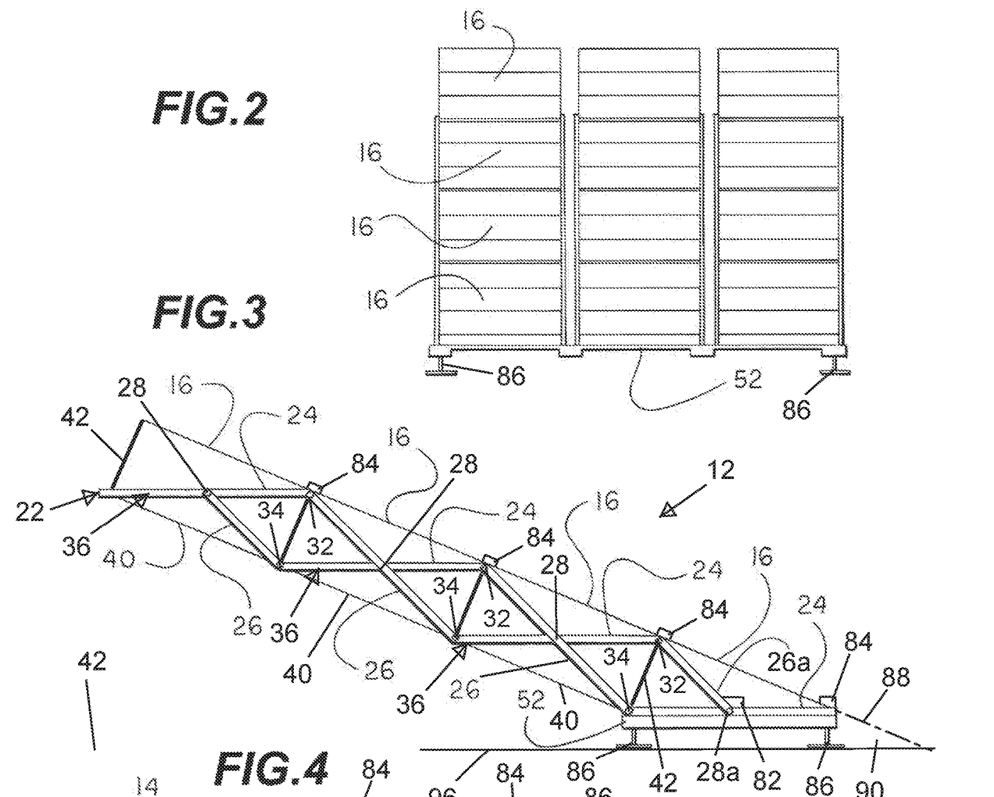
FIG. 2 is a front elevation view of the first embodiment of the solar photovoltaic panel array of the deployable solar photovoltaic power generation system in the deployed configuration in accordance with the present invention.
FIG. 3 is a side elevation view of the first embodiment of the solar photovoltaic panel array of the deployable solar photovoltaic power generation system in the deployed configuration in accordance with the present invention.
Figure 4:
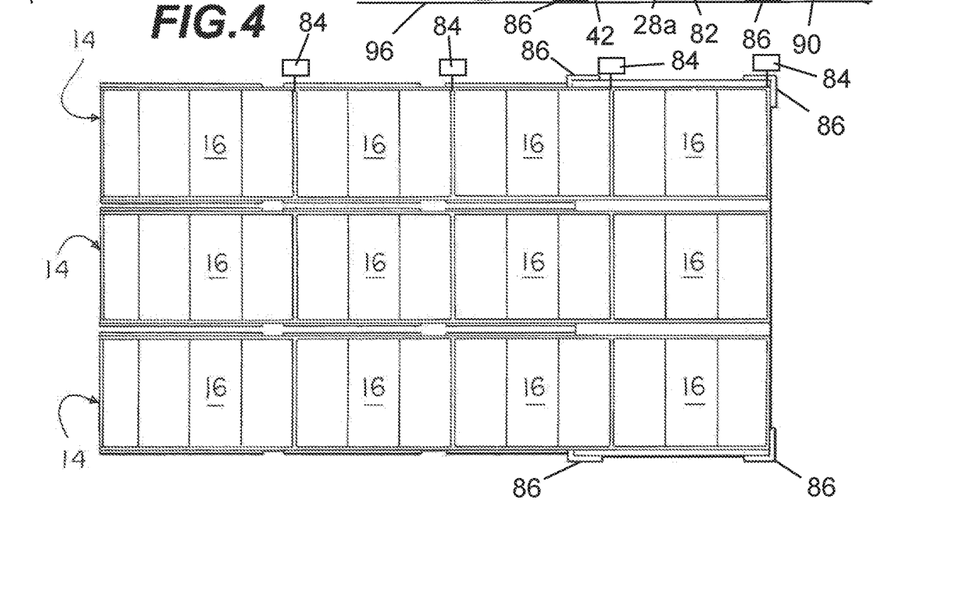
FIG. 4 is a top plan view of the first embodiment of the solar photovoltaic panel array of the deployable solar photovoltaic power generation system in the deployed configuration in accordance with the present invention.

With reference to FIG. 3, an upper flexible tension cable 38 connects the upper endpoints 32 in the longitudinal direction of each truss 22, and a lower flexible tension cable 40 connects the lower endpoints 34 in the longitudinal direction of each truss 22. The upper tension cable 38 and the lower tension cable 40 serve to limit the distance between the endpoints 32 and 34 respectively once the trusses 22 of the wings 14 have been fully deployed. Once the four-point expandable trusses 22 of the wings 14 have been deployed and the tension cables 38 and 40 are tight, compression members 42 rotate into positions between the adjacent upper endpoints 32 and lower endpoints 34 to establish the distance between the series of upper endpoints 32 and lower endpoints 34 and thus provide additional structural integrity to the extended trusses 22 of the wings 14.

FIGS. 5A-5F illustrate deployment of the solar panel array 12. FIG. 5A shows the solar panel array 12 in its stowed position. In order to deploy the solar panel array 12 with its expandable truss 22, an actuator, such as a servo motor 82 is connected to upwardly extending truss arm 26a and, when activated, rotates truss arm 26a counterclockwise about center connection 28a as shown in FIGS. 5B-5F. Rotating truss arm 26a clockwise about center connection 28a causes the truss 22 to retract to its stowed position shown in FIG. 5A. While the figures illustrate a servo motor 82 for rotating truss arm 26a to extend and retract the truss 22, the actuator may also include a two-way air or hydraulic cylinder disposed between center connections 28. Further, a two-way cylinder between upper endpoints 32 and lower endpoints 34 can also be employed to extend and retract the truss 22. Further, the two-way cylinders can be used to replace the compression members 42.

Figure 1:
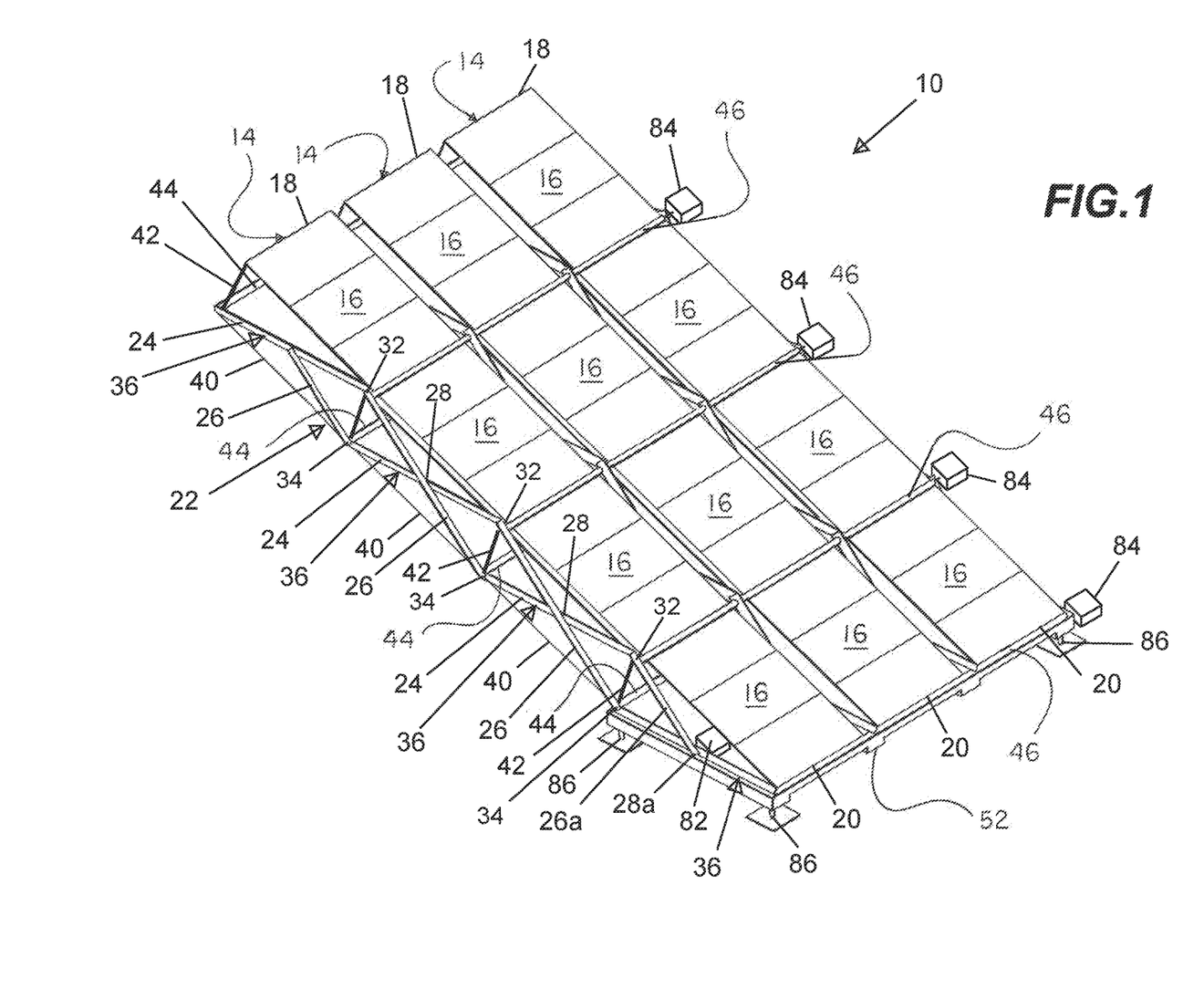
FIG. 1 is a side perspective view of a first embodiment of a solar photovoltaic panel array of a deployable solar photovoltaic power generation system in the deployed configuration in accordance with the present invention.
Figure 5E:
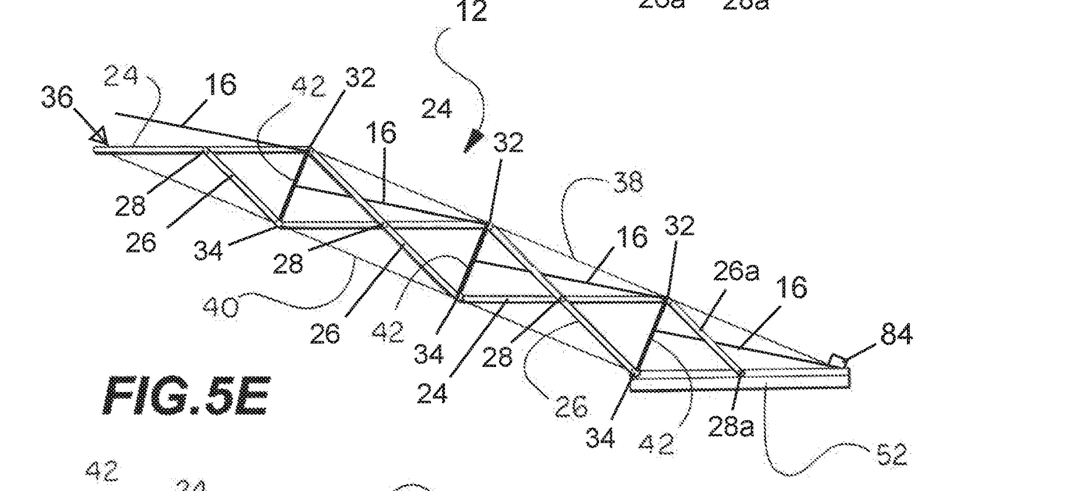
Figure 5F:
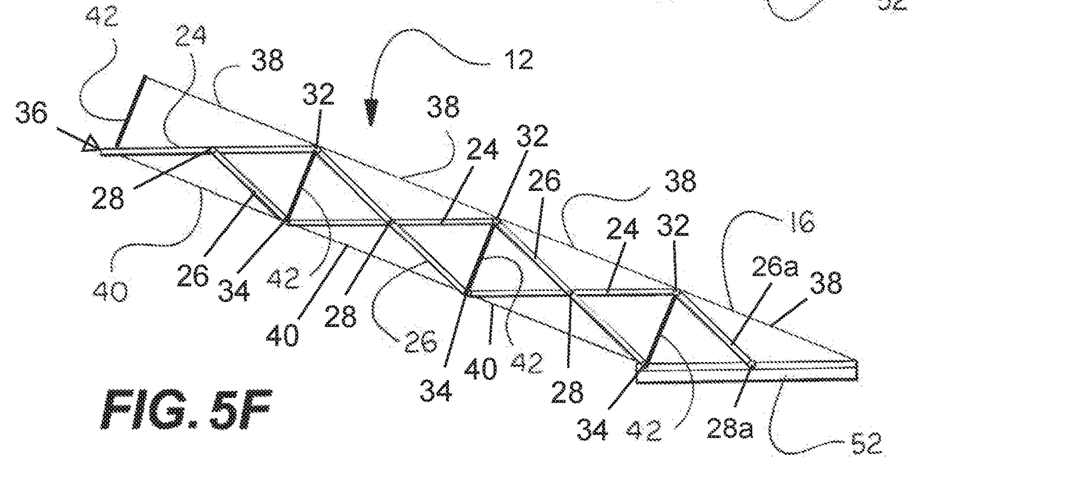

Once the four-point expandable trusses 22 for each wing 14 have been fully extended, the forward ends 18 of the solar photovoltaic panels 16 rotate upward by means of a torsion spring or a servo motor 84 about the rear cross member 46 of the horizontal panel frames 36 (FIG. 1). Upward rotation of the solar photovoltaic panels is arrested when the forward end 18 of the solar panel 16 contacts stops on the rear cross member 46 of the next upward adjacent horizontal panel frame 36. FIG. 5E shows the solar panels 16 rotated partially between the support position on the horizontal panel frames 36 and the upper most rotation when the forward end 18 of the solar panel 16 in contact with the stop on the rear cross member 46 of the next adjacent horizontal panel frame 36. Once the solar panels 16 have rotated upwardly and are engaged by the stops, all of the solar panels 16 on each wing 14 lie in a common plane 88 that also includes the top cross members 46 (FIG. 3). Because solar panels 16, however, can be rotated between a horizontal position in engagement with the horizontal panel frame 36 and an elevated position in engagement with the rear cross member 46 of the next upwardly adjacent horizontal panel frame 36, the solar panels 16 can be positioned like louvers to reduce the wind resistance of the solar panel array 12, or the solar panel 16 can be positioned in the common plane 88 to provide maximum exposure to the sun's rays. The common plane 88 defines a truss deployment angle 90 with respect to the horizontal 96 (FIG. 3).

Further, the ballast base 52 is equipped with jacks 86 that contact the ground surface. The jacks 86 can be adjusted to accommodate uneven ground. Further, the jacks 86 can be used to vary the truss deployment angle 90 in order to position the solar panels 16 in the common plane 88 so that the sun's rays strike the solar panels 16 as close as possible to 90° to the common plane 88 of the solar panel 16.

The deployment angle 90 can also be controlled by varying the degree to which the four-point expandable truss 22 is deployed. As the four-point expandable truss 22 is deployed by means of the servo motor 82 the rear cross members 46 define a common plane 88 that begins with deployment angle 90 that is virtually perpendicular from the horizontal (FIG. 5A). When fully extended as shown in FIG. 3, the deployment angle 90 is less than the original deployment angle of the common plane 88.

Figure 7:
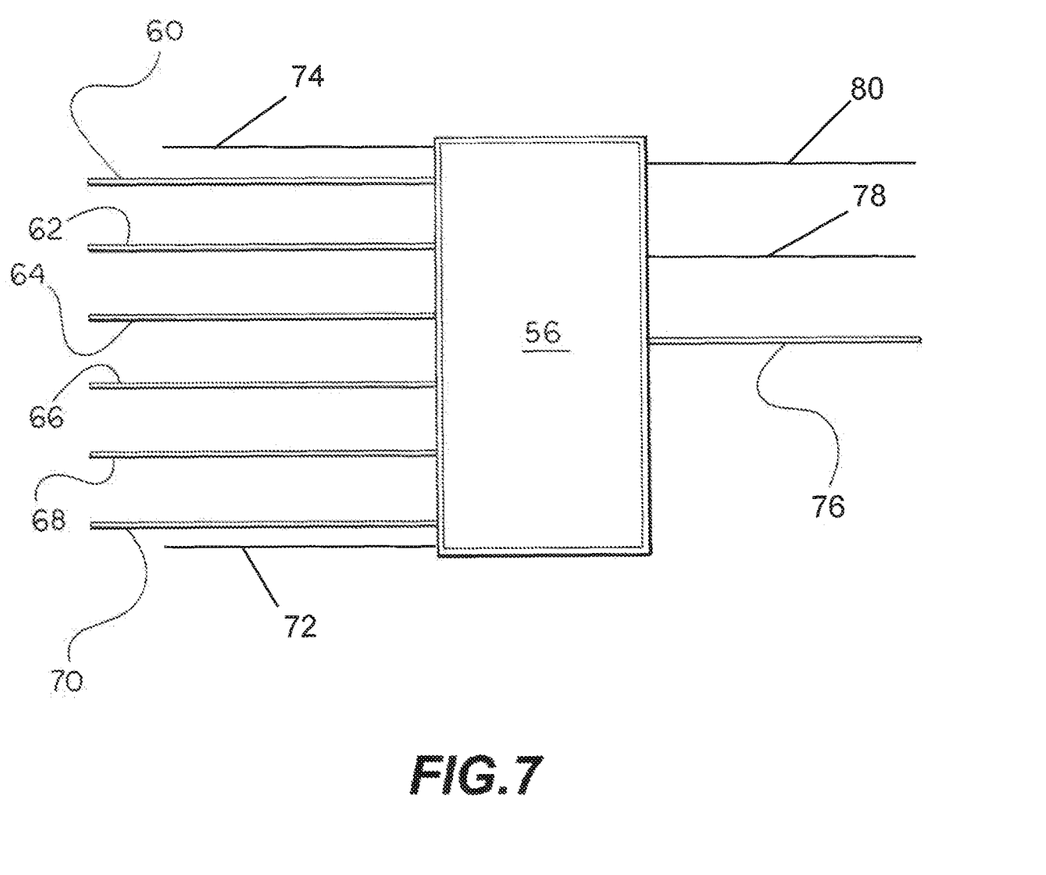
FIG. 7 will is a block diagram of the controller for deploying and stowing the wings of the deployable solar photovoltaic power generation system.

FIG. 7 shows a controller 56 that controls the operation of the foldable solar panel array 12. The controller 56 has deployment output 76 that controls the servomotor 82 for deploying and retracting the solar panel array 12. The controller 56 has panel rotation output 78 that controls the servomotors 84 for rotating the solar panels 16 between a position in the common plane 88 and a louvered position. The controller 56 has base angle output 80 that controls the jacks 86 for leveling the ballast base 52 and adjusting the deployment angle 90 of the solar panel array 12.

In order to control the servomotor 82 for deploying and retracting the solar panel array 12, the servomotors 84 for rotating the solar panels 16, and the jacks 86 for leveling the ballast base 52 and adjusting the deployment angle 90 of the solar panel array 12, the controller 56 processes a variety of inputs including but not limited to wind speed 60, barometric pressure 62, sunlight intensity 64, weather forecast data 66, panel weight (snow and ice cover) 68, seismic data 70, date/time 72, and latitude 74.

The primary feature of the present invention is the deployment and retraction of the solar panel array 12 in order to avoid damage to the solar panel array 12 as the result of high winds, snow and ice accumulation, or other natural disasters such as earthquakes. Controller 56 monitors predictive inputs, such as barometric pressure 62, weather forecast data 66, and seismic data 70, to predict the onset of inclement weather that may include winds and to predict the onset of earth tremors both of which have the potential to damage the extended solar panel array 12. Further, the controller 56 monitors current inputs, such as current wind speed 60 and snow and ice 68 on the solar panels 16, which might damage the solar panel array 12 or affect the function of the solar panels 16. Based on those predictive and current inputs, the controller 56 can adjust the solar panel array 12 by first rotating the solar panels 16 by means of a control signal on the panel rotation output 78. By rotating the solar panels 16 from their upper position toward there lower position, the solar panel array 12 presents a louver-like structure that has less wind resistance than when all of the solar panels 16 are within the common plane 88. If, on the other hand, the wind increases further, the controller 56 in response to the current wind speed 60 can retract the solar panel array 12 to its stowed position shown in FIG. 5A.

Further, based on the time/date input 72 and the latitude input 74, the controller 56 can adjust the deployment angle 90 of the solar panels 16 in the common plane 88 by a signal on base angle output 80 that controls the operation of the jacks 86. Such control of the jacks 86 by the controller 56 can orient the solar panel 16 in the most advantageous orientation to the position of the sun for the latitude and time of day. Also, based on the light intensity 64, the controller 56 can determine whether the amount of sunlight available is sufficient to produce a threshold amount of electricity. If output of electricity from the solar panel 16 falls below the threshold based on the amount of light available, the controller 56 can retract the solar panel array 12 for storage such as at night.

Figure 6A:
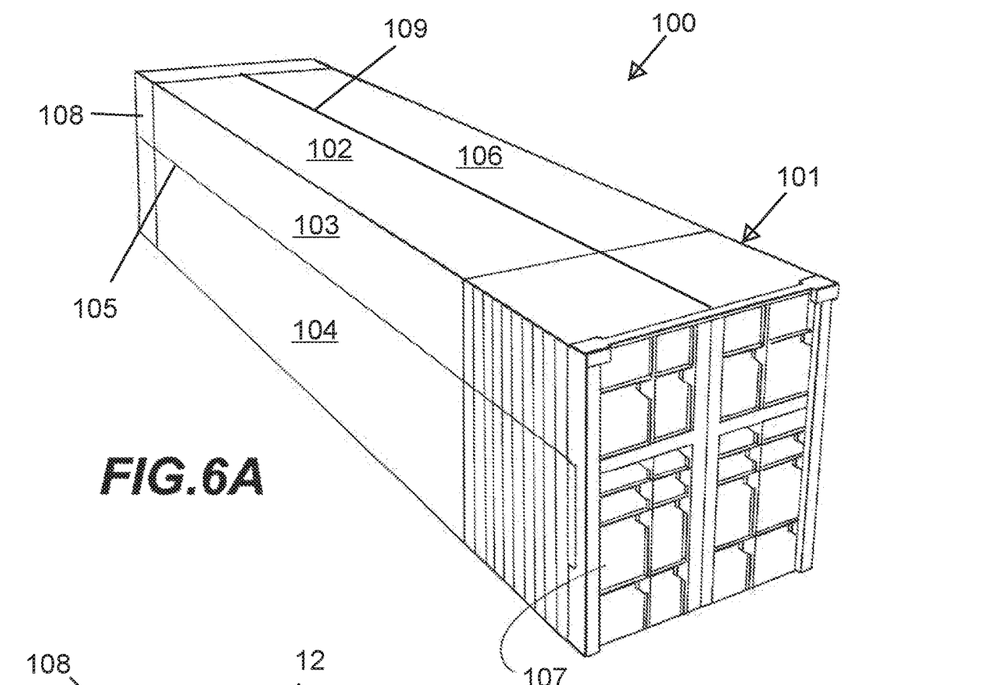
FIG. 6A-6D are side perspective views of a second embodiment of a solar photovoltaic panel array of a deployable solar photovoltaic power generation system showing the deployment sequence in accordance with the present invention.
Figure 6B:
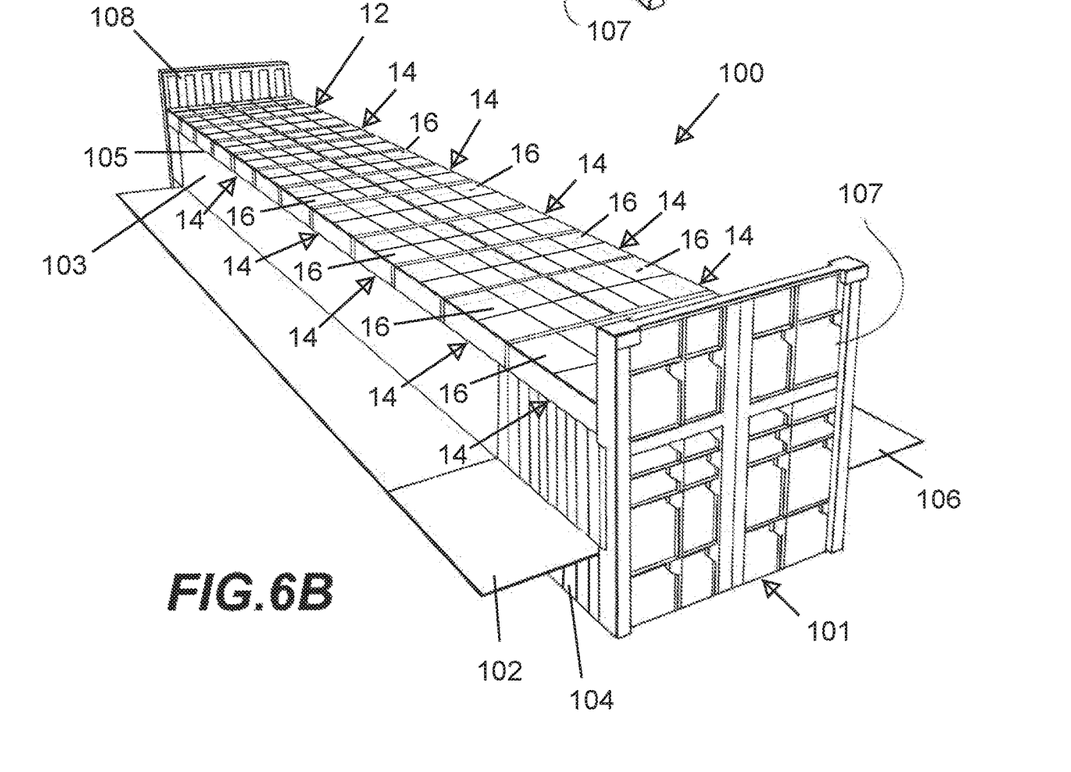

Turning to FIGS. 6A-6D, a second embodiment of a deployable solar photovoltaic power generation system 100 comprises a standard size intermodal container 101 with a foldable solar panel array 112 stored inside (FIG. 6B). With reference to FIG. 6A, the intermodal container 101 has a front end 107 and a back end 108. The intermodal container 101 also includes a stationary lower left side panel 104 and a matching stationary lower right side panel (not shown). As shown in FIG. 6A, the intermodal container 101 has a left top panel 102 and a right top panel 106 separated by opening line 109. The left top panel 102 is connected to an upper left side panel 103. The upper left side panel 103 is hinged to the stationary lower left side panel 104 at hinge line 105.

As shown in FIG. 6B, the left top panel 102 and the upper left side panel 103 pivot at hinge line 105 to the open position with the upper left side panel 103 abutted against the stationary lower left side panel 104 and with the left top panel 102 protruding outwardly. Similarly, the right top panel 106 and the upper right side panel pivot to the open position shown in FIG. 6B. With the top panels and upper side panels open, the foldable solar panel arrays 12 are exposed as shown in FIG. 6B.

Figure 6C:
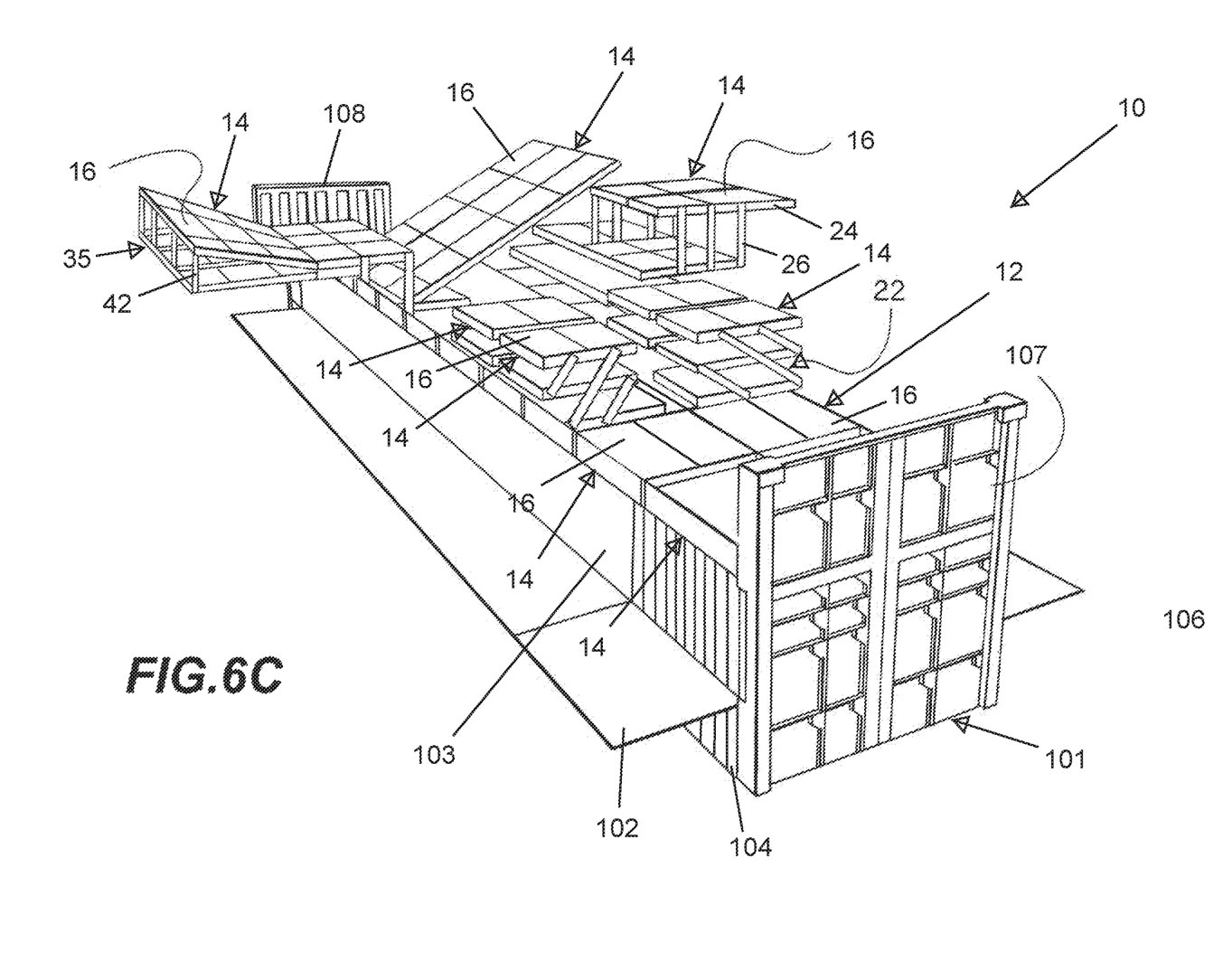
Figure 6D:
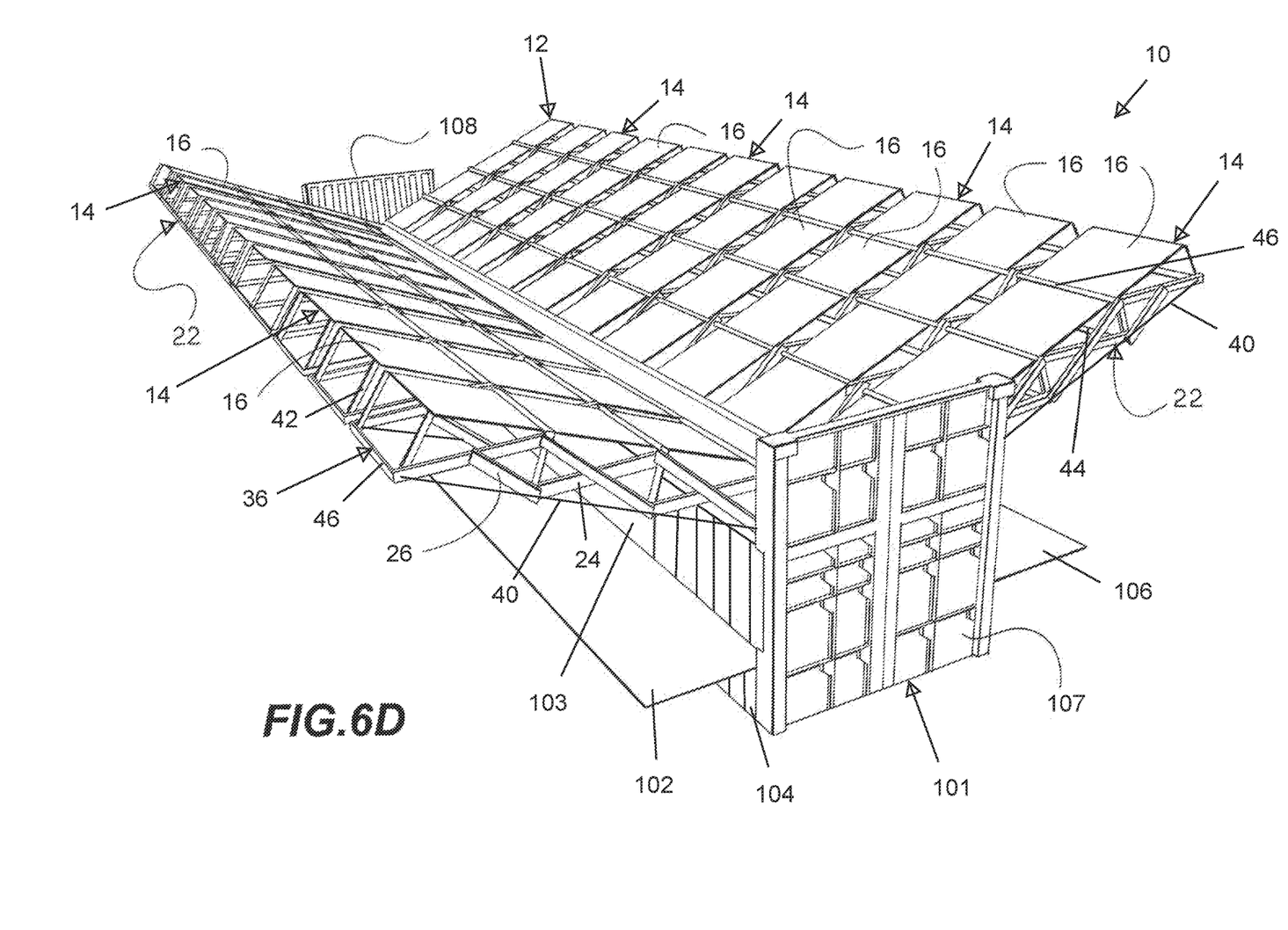

Once the top panels in the upper side panels have been opened, the foldable solar panel arrays 12 can be deployed using the four-point expandable trusses 22 as previously described and as shown in the sequence of FIG. 6C-6D. Particularly, the construction and deployment of the solar panel wings 14 utilizing the four-point expandable trusses 22 are the same as previously described with respect to FIGS. 1-5F with the same reference numerals used for the same parts previously described in connection with FIGS. 1-5F.

The standard intermodal container 101 facilitates transportation from one location to another. Moreover, the intermodal container 101 provides a robust storage container that protects the foldable panel array 12 when the foldable panel array 12 is stowed during inclement weather.

While this invention has been described with reference to preferred embodiments thereof, it is to be understood that variations and modifications can be affected within the spirit and scope of the invention as described herein and as described in the appended claims.

I claim:

1. A deployable solar photovoltaic power generation system comprising:
   a. a ballast base;
   b. a foldable solar panel array mounted on the ballast base and including:
      i. a solar wing extendable from the ballast base, the solar wing comprising:
         (a) an extendable truss including a solar panel frame; and
         (b) a solar photovoltaic panel rotatably supported on the solar panel frame of the extendable truss, wherein the solar photovoltaic panel is rotatable with respect to the solar panel frame; and
      ii. a first actuator for extending and retracting the extendable truss; and
   c. a controller for driving the actuator to extend and retract the extendable truss.

2. The deployable solar photovoltaic power generation system of claim 1, wherein the foldable solar panel array includes a servo motor for rotating the solar photovoltaic panel with respect to the solar panel frame and wherein the controller in response to environmental conditions controls the servo motor to rotate the solar photovoltaic panel with respect to the solar panel frame.

3. The deployable solar photovoltaic power generation system of claim 1, wherein the controller in response to environmental conditions extends and retracts the extendable truss.

4. The deployable solar photovoltaic power generation system of claim 1, wherein the extendable truss comprises at least two side-by-side four-point extendable trusses, each four-point extendable truss comprising:
   a. a series of horizontal truss arms and a series of upwardly extending truss arms connected for rotation at a center connection, wherein each adjacent horizontal trust arm and each adjacent upwardly extending truss arms are connected at an upper endpoint and a lower endpoint;
   b. a series of rear cross members extending between the upper endpoints of the side-by-side four-point extendable trusses;
   c. a series of forward cross members extending between the lower endpoints of the side-by-side four-point extendable trusses, wherein the horizontal trust arms, one of the rear cross members, and an adjacent rear cross member form the solar panel frame in a horizontal orientation; and
   d. a series of solar photovoltaic panels rotatably supported on the horizontally oriented solar panel frames.

5. The deployable solar photovoltaic power generation system of claim 4, wherein the rear cross members lie in a single plane extending at an angle above the horizontally oriented solar panel frames and wherein the solar photovoltaic panels are rotatably connected to the rear cross members for rotation with respect to the horizontally oriented solar panel frames by the servo motor.

6. The deployable solar photovoltaic power generation system of claim 4, wherein a compression member is positioned between the upper endpoint and the lower endpoint to establish a distance between the upper endpoint and the lower endpoint.

7. A deployable solar photovoltaic power generation system comprising:
   a. an intermodal container;
   b. a foldable solar panel array mounted in the intermodal container and including:
      i. a solar wing extendable from the ballast base, the solar wing comprising:
         (a) an extendable truss including a solar panel frame; and
         (b) a solar photovoltaic panel rotatably supported on the solar panel frame of the extendable truss, wherein the solar photovoltaic panel is rotatable with respect to the solar panel frame; and
      ii. a first actuator for extending and retracting the extendable truss; and
   c. a controller for driving the actuator to extend and retract the extendable truss.

8. The deployable solar photovoltaic power generation system of claim 7, wherein the foldable solar panel array includes a servo motor for rotating the solar photovoltaic panel with respect to the solar panel frame and wherein the controller in response to environmental conditions controls the servo motor to rotate the solar photovoltaic panel with respect to the solar panel frame.

9. The deployable solar photovoltaic power generation system of claim 7, wherein the extendable truss comprises at least two side-by-side four-point extendable trusses, each four-point extendable truss comprising:
   a. a series of horizontal truss arms and a series of upwardly extending truss arms connected for rotation at a center connection, wherein each adjacent horizontal trust arm and each adjacent upwardly extending truss arms are connected at an upper endpoint and a lower endpoint;
   b. a series of rear cross members extending between the upper endpoints of the side-by-side four-point extendable trusses;
   c. a series of forward cross members extending between the lower endpoints of the side-by-side four-point extendable trusses, wherein the horizontal trust arms, one of the rear cross members and an adjacent rear cross member form solar panel frame in a horizontal orientation; and d. a series of solar photovoltaic panels rotatably supported on the horizontally oriented solar panel frames.

10. The deployable solar photovoltaic power generation system of claim 9, wherein the rear cross members lie in a single plane extending at an angle above the horizontally oriented solar panel frames and wherein the solar photovoltaic panels are rotatably connected to the rear cross members for rotation with respect to the horizontally oriented solar panel frames by the servo motor.

11. The deployable solar photovoltaic power generation system of claim 9, wherein a compression member is positioned between the upper endpoint and the lower endpoint to establish a distance between the upper endpoint and the lower endpoint.

12. The deployable solar photovoltaic power generation system of claim 7, wherein the controller in response to environmental conditions extends and retracts the extendable truss.

13. A deployable solar photovoltaic power generation system comprising:
   a. a ballast base;
   b. a foldable solar panel array mounted on the ballast base and including:
      i. a solar wing extendable from the ballast base, the solar wing comprising:
         (a) at least two side-by-side four-point extendable trusses comprising:
            (1) a series of horizontal truss arms and a series of upwardly extending truss arms connected for rotation at a center connection, wherein each adjacent horizontal trust arm and each upwardly extending truss arms are connected at an upper endpoint and a lower endpoint;
            (2) a series of rear cross members extending between the upper endpoints of the side-by-side four-point extendable trusses;
            (3) a series of forward cross members extending between the lower endpoints of the side-by-side four-point extendable trusses, wherein the horizontal trust arms, one of the rear cross members, and an adjacent rear cross member form a horizontal solar panel frame; and
         (b) a series of solar photovoltaic panels supported on the horizontal panel frames; and
         (c) a compression member positioned between the upper endpoint and the lower endpoint to establish a distance between the upper endpoint and the lower endpoint; and
      ii. a first actuator for extending and retracting the four-point extendable trusses; and
   c. a controller for driving the actuator to extend and retract the four-point extendable trusses.

\* \* \* \* \*